United States Patent

[11] 3,583,495

| [72] | Inventors | John Isaac Cantral;<br>Robert Otto Taube, both of Moline, Ill. |
|---|---|---|
| [21] | Appl. No. | 721,315 |
| [22] | Filed | Apr. 15, 1968 |
| [45] | Patented | June 8, 1971 |
| [73] | Assignee | Deere & Company<br>Moline, Ill. |

[54] IMPLEMENTS WITH TAIL WHEEL LIFT ASSISTS
10 Claims, 3 Drawing Figs.

[52] U.S. Cl. ................................................. 172/316,
172/328, 172/413, 172/449, 280/414.5
[51] Int. Cl. ................................................. A01b 63/22
[50] Field of Search ........................................... 172/244,
315, 316, 395, 294, 413, 445, 446, 448, 449, 439,
2, 47, 464, 452, 7, 491, 328; 60/52 HE; 280/414.5,
489

[56] References Cited
UNITED STATES PATENTS

| 2,830,519 | 4/1958 | Chandler et al. | 172/413X |
| 2,151,057 | 3/1939 | Suth | 60/52HE |
| 2,946,144 | 7/1960 | Anderson | 60/52HEX |
| 2,960,172 | 11/1960 | Henson | 172/315X |
| 3,035,645 | 5/1962 | Wilson et al. | 172/445 |
| 3,062,301 | 11/1962 | Pomper | 172/2X |
| 3,065,803 | 11/1962 | Pierson | 172/316X |
| 3,307,275 | 3/1967 | Simi | 60/52HEX |
| 3,235,286 | 2/1966 | Meadowcroft | 280/489 |
| 3,336,049 | 8/1967 | Cayton | 280/414.5 |

*Primary Examiner*—Robert E. Pulfrey
*Assistant Examiner*—Stephen C. Pellegrino
*Attorneys*—H. V. Harsha, Harold M. Knoth, William A. Murray and John M. Nolan ABSTRACT: An implement for use with a tractor having a conventional three-point hitch including a pair of lower draft links and an upper compression link, the implement being provided with a hydraulically actuated tail wheel for lifting the rear end of the implement, the forward end of the implement being secured to the lower draft links and having a pivoted mast the upper end of which is secured to the upper compression link, there being lockable means for preventing rotation of the mast relative to the frame during certain phases of operation of the implement.

PATENTED JUN 8 1971 3,583,495
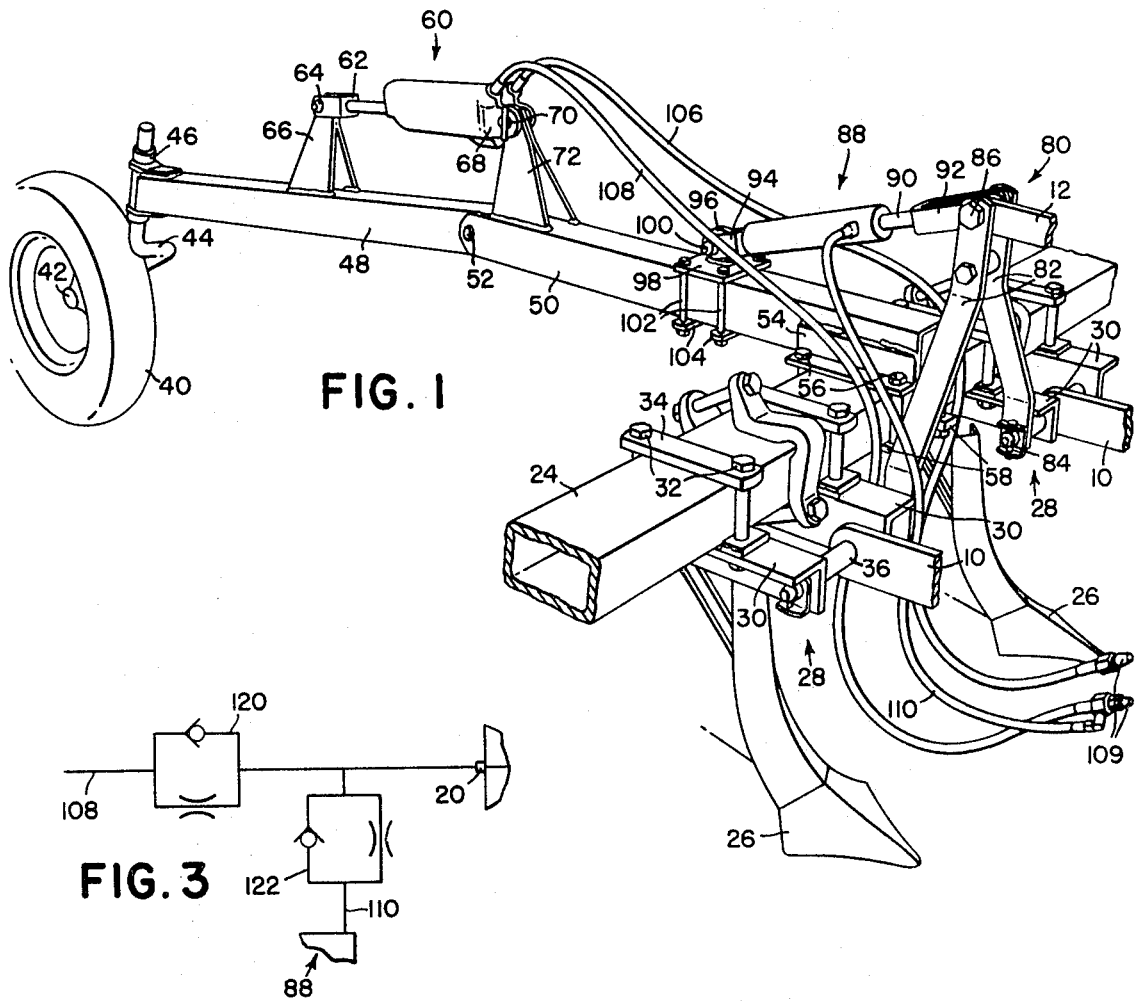
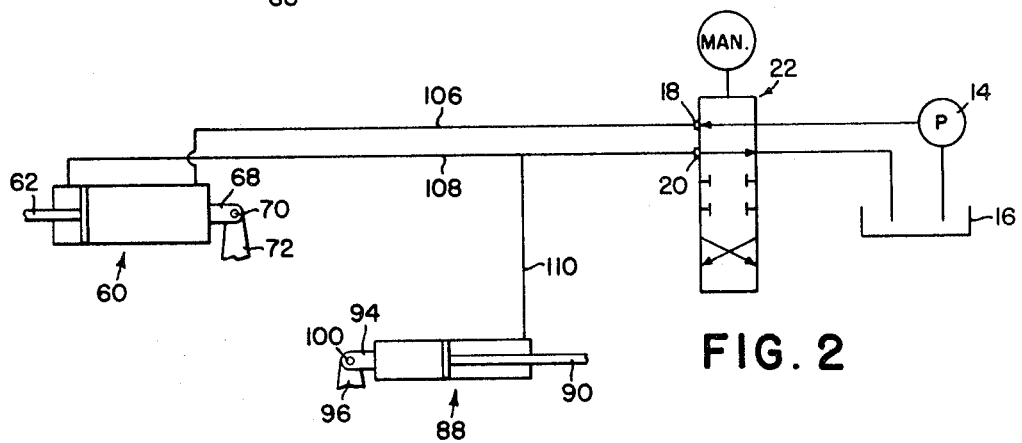
INVENTORS
JOHN I. CANTRAL
ROBERT O. TAUBE
BY John C. Thompson
ATTORNEY

IMPLEMENTS WITH TAIL WHEEL LIFT ASSISTS

FIELD OF THE INVENTION

This invention relates generally to agricultural implements and more particularly to implements or implement carriers, which are securable to a tractor three-point hitch, the implement having a hydraulically operable tail wheel for assisting in raising and lowering the implement relative to the ground.

DESCRIPTION OF THE PRIOR ART

Trailing implements which are supported at their front ends by vertically movable tractor hitches and supported at their rear ends by a ground-engaging wheel are generally referred to as semimounted or semi-integral implements. These implements have become increasingly popular in recent years. The reason for this popularity has been due to the fact that semimounted equipment has the advantages of mounted equipment in weight transfer to the tractor and maneuverability. It also has the advantage of drawn equipment in that to transport the implement the tractor need not lift the implement entirely off the ground. This feature has made semi-integral equipment particularly desirable as many of today's high horsepower tractors can now pull more than they can lift.

One form of semimounted equipment is shown in U.S. Pat. No. 3,228,484 to Arnold et al. In this form, the implement is provided with a forward crossbeam which is secured to the lower draft links of a tractor three-point hitch, the implement having a rear ground-engaging wheel which is movably vertically relative to the frame of the implement. When this form of implement is secured to a tractor, the upper or compression link of the tractor is not employed and thus the implement is free to rotate about a pivot line extending between the ends of the lower draft links. With this form of implement, it may be necessary to provide a gauge wheel to prevent the implement from working the ground too deeply.

Another form of semi-mounted implements is shown in U.S. Pat. No. 3,336,049 to D. W. Cayton. In this form, the forward end of the implement is rigidly secured to both the lower draft links and the upper or compression link of a tractor three-point hitch. With this form of device it is desirable to raise the rear end of the implement at the same time that the forward end is raised. It should be noted that with this type of implement the implement cannot move freely about the pivot line extending between the rear ends of the lower draft links.

It has been found that with an implement having a plurality of tools mounted on a transversely extending tool bar that it is necessary to mount the implement on a tractor with the implement secured to the upper link in addition to the draft links. If the implement were secured to the draft links only, it would be free to rotate about the axis extending through the rear ends of the draft links, and it would not be possible to maintain the desired working depth. Thus, in soft soils if the implement were free to rotate, the ground-working tools would tend to penetrate to too great a depth. On the other hand, if the soil were particularly hard, the ground-working tools would not work as deeply as desired.

It has also been found that when a plurality of tools are mounted on a transversely extending tool bar and secured to the tractor in the manner shown in the Cayton patent that they will work quite satisfactorily in most ground conditions. Some difficulty has been encountered in transporting these implements where the terrain is uneven. Thus, when the tractor passes through a gully or ditch, the top link on the tractor will be placed under considerable compression, causing undue strain on both the implement and the tractor hitch. Alternatively, when the tractor passes over a small hill or rise, the rear wheel of the implement will tend to leave the ground, or in the alternative the front end of the tractor may be raised off the ground due to the weight of the implement.

SUMMARY OF THE INVENTION

It is an object of the present invention to provide a semimounted implement which does not have the operational disadvantages of the foregoing prior art.

More particularly, it is an object of the present invention to provide an implement which may be interconnected with the tractor three-point hitch in such a manner that when the implement is in its ground-working position, the implement is supported by both the lower draft links and the upper compression link but when the implement is held in its transport position, the implement is supported by the lower draft links of the tractor and a rear tail wheel.

A further object of this invention is to provide an implement having a vertically extending mast which is secured to the frame of the implement to pivot about a transversely extending axis, there being provide means to lock the mast from rotation when the implement is in its normal ground-working position, but operable to permit the mast to rotate when the implement is in its transport position.

A still further object of the present invention is to provide means interconnectable with the tractor to cause the mast of an implement to be held in a locked position against pivotal movement about a transversely extending axis when the rear wheel of the implement is held in its raised position, the means also providing for pivotal movement of the mast when the rear ground wheel is held in its lower ground-working position.

These and other objects and advantages of this invention will be apparent to those skilled in the art after a consideration of the following detailed description, taken in conjunction with the accompanying drawings in which the preferred form of this invention is illustrated. BRIEF DESCRIPTION OF THE DRAWINGS FIG. 1 is a perspective view of a portion of an implement secured to the three-point hitch of a conventional farm tractor, the implement incorporating the features of this invention.

FIG. 2 is a schematic view illustrating the manner in which the hydraulic cylinders illustrated in FIG. 1 are interconnected with the conventional tractor hydraulic system.

FIG. 3 is a schematic view illustrating a slightly modified portion of a hydraulic system shown in FIG. 2. DESCRIPTION OF THE PREFERRED EMBODIMENT The implement of the present invention is designed to be used with a tractor having a conventional three-point hitch including lower draft links 10 and an upper or compression link 12. The tractor is also provided with a conventional hydraulic system having a pump 14 which receives fluid from a reservoir 16, and a pair of fluid outlets 18 and 20, which may be alternately connected with the pump 14 and reservoir 16 by means of a manually actuatable valve, indicated generally at 22.

The implement of this invention has a transversely extending tool bar 24 to which a plurality of ground-working tools 26 may be secured. The tools may be listers, planters or other ground-working devices. The tool bar 24 is provided with a pair of forwardly extending attaching members, indicated generally at 28, which are secured to the lower draft links 10 of the tractor. Each of the structures 28 include a pair of angle irons 30 which are secured to the tool bar 24 by means of a pair of bolts 32 and a strap 34 in the manner shown in FIG. 1. The forward ends of the angle irons 30 are apertured and the transversely extending hitch pin 36 passes therethrough, the hitch pin being disposed within a corresponding aperture in the rear end of the draft links 10.

The rear end of the implement is supported by a ground engaging wheel 40 which is rotatably disposed about a stub axle 42 carried by a vertically extending spindle 44 which is journaled for rotation within a sleeve member 46 welded or otherwise secured to the rear end of a longitudinally extending rear frame member 48. The rear frame member or arm 48 is apertured at its forward end and is secured to an apertured front longitudinal frame member 50 by a transversely extending pivot pin 52. The forward end of the front main frame member has a pair of angles 54 welded thereto, the angles being secured to the transversely extending tool bar 24 by means of bolts 56 which also pass through a strap member 58 disposed underneath the bar 24.

While the front longitudinal frame member 50 is held integrally with the transversely extending tool bar 24, it can be seen that the rear longitudinal frame member or arm 48 is swingable about the transversely extending pivot 52. To effect vertical movement of the ground-engaging wheel 40, a hydraulic cylinder assembly, indicated generally at 60, is provided, the rod end 62 being pivotally interconnected 64 with an upstanding bracket 66 carried by the rear frame member 48, and the anchor end 68 of the cylinder being pivotally interconnected at 70 with the upstanding bracket 72 carried by the front frame member 50. Extension and retraction of the cylinder assembly 60 will cause the ground-engaging wheel to be lowered and raised relative to the tool bar 24.

It is a principal feature of this invention to provide a mast structure which has its lower end pivotally connected to the tool bar 24 and its upper end secured to the upper compression link 12 of a tractor, there being provided means to hold the mast from swinging relative to the tool bar when the ground-working tools 26 are in their lowered ground-working position, but permitting the mast to swing relative to the tool bar 24 when the tool bar 24 is held in its raised position when the ground-engaging wheel 40 is in its lowered position. To this end a mast, indicated generally at 80, is provided, the mast including a pair of downwardly divergent members 82 whose lower ends are apertured and are rotatably carried by the inner ends 84 of the hitch pins 36. A bolt 86 passes through apertures in the upper end of the downwardly diverging members 82 and the upper compression link 12 is secured about an intermediate portion of the bolt 86.

A single acting cylinder, indicated generally at 88, serves to lock the mast from relative rotation about the sum 36. The assembly 88 has a rod 90 which has a bifurcated end portion 92 secured to the pivot bolt 86 to either side of the upper link 12. The anchor end 94 of the cylinder 88 is secured to a lug 96 on a plate 98 by means of a pivot 100. This plate is in turn bolted to the forward frame member 50 by means of bolts 102 and straps 104.

Cylinder assembly 60 is connected to the tractor outlets 18, 20 by a pair of fluid lines 106, 108, each being provided with a coupler 109 connectable directly to an outlet 18 or 20. The cylinder 88 is interconnected to the tractor outlet 20 through a line 110 and a T-fitting in line 108.

During transportation the valve 22 is normally placed in the position shown in FIG. 2. This causes fluid from the tractor to be introduced into the cylinder 60 through fluid line 106, the cylinder 60 being fully extended forcing the ground-engaging wheel downwardly. Fluid from the rod end of the cylinder will be returned to the reservoir through fluid line 108. During transportation the cylinder 88 will be in communication with the reservoir 16 through a fluid line 110 which joins with the fluid line 108 before port or outlet 20. Thus, the cylinder 88 will be in a "float" position and the tool bar 24 can pivot about the hitch pins 36.

To lower the implement into its normal ground-working position, it is necessary to reverse the valve from the position shown in FIG. 2 to a position where the pump 14 is connected with the port 20 and the reservoir 16 with the port 18. In this position, fluid will be introduced into the rod end of the cylinder 60 causing the wheel 40 to be raised and also to fully retract the cylinder 88 locking the tool bar 24 in its desired working position with respect to the mast 80. It should be noted that the parts can be adjusted to have the wheel 40 raised so it does not contact the ground when the tools 26 are in their ground-engaging position.

While the construction shown in FIGS. 1 and 2 is generally satisfactory, in certain loose ground conditions difficulties have been encountered when raising and lowering the implement. Thus, when using planters mounted behind listers, it has been found, during the raising and lowering operation, that the implement may rotate downwardly about the axis defined by the hitch pins 36 causing the seed tubes of the planter to become clogged. For example, when going from the transport position to the ground-working position, the valve 22 is moved from the position shown in FIG. 2 to a position where the fluid from the pump 14 will enter the line 108. In this situation, the fluid may retract the cylinders 60 and 88 either simultaneously or one before the other. If the fluid enters into the cylinder 60 prior to the cylinder 88, the tool bar 24 can rotate downwardly about the axis of the hitch pins 36. A similar problem exists when going from the normal ground-working position in which cylinders 60 and 88 are fully retracted to the raised transport position. In this case, the valve is moved from a position where the pump output is directed into lines 108, 110 to the position shown in FIG. 2 where the pump output is directed into line 106. When in this position the fluid in cylinder 88 is connected to the discharge side of the pump. If the fluid is dumped from cylinder 88 before the cylinder 60 is extended, then the rear end of the implement may swing down causing seed tubes to become plugged.

To overcome the foregoing disadvantages, one-way restrictor valves, illustrated schematically in FIG. 3, may be provided in line 108 and 110. One of the restrictor valves 120 is placed in line 108 between the cylinder 60 and the junction with line 110. This valve permits restricted flow from the pump 14 into the cylinder 60 and unrestricted flow from the cylinder 60 towards the reservoir 16. The other one-way restrictor valve 122 is placed in line 110 and permits unrestricted fluid flow into the cylinder 88 while restricting the flow from the cylinder 88 to the reservoir.

By employing these valves when the valve 22 is moved from the position shown in FIG. 2 to the position where the pump is connected with lines 108 and 110 through outlet 20, the flow from the pump will be into the mast cylinder 88 first, and then into the lift cylinder 60, causing the cylinders 88 and 60 to be sequentially retracted. Plugging of seed tubes mounted to the rear of listers is prevented since the implements carried on the tool bar 24 will not rotate downwardly about the axis of the draft pins 36. Similarily, when moving from the ground-working position to the raised transport position, downward swinging is prevented by restricting the flow from the cylinder 88. This is accomplished through the use of the restrictor 122 in line 110. Thus, when the line 108 is connected to the reservoir 16 by positioning the valve 22 in the position shown in FIG. 2, fluid from the cylinder 88 must flow through the restrictor. This causes the cylinder 60 which flows through the open valve 120 to be discharged first raising the implement while preventing backward tipping.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. In combination with a tractor having a pair of lower links and an upper link and a fluid system including a fluid reservoir, pump, and valve means operable to alternately interconnect a pair of fluid outlets on the tractor with said pump and said reservoir, an implement including a frame pivotally interconnected with said lower draft links, a generally vertically extending mast pivotally carried by said frame and interconnected at its upper end with said upper link, a single-acting hydraulic cylinder interconnecting said frame with the upper end of said mast and operable when under pressure to hold said mast and frame in fixed relative positions and when not under pressure to permit the frame to pivot relative to the mast, a ground-engaging wheel means rotatably carried on an arm pivotally secured to said frame, and a double-acting extensible and retractable hydraulic cylinder mounted between said arm and said frame downwardly to raise the rear end of the implement, and when retracted to permit the rear end of the implement to assume a ground-working position, a pair of fluid lines interconnecting the double-acting hydraulic cylinder with said pair of outlets, and a further fluid line interconnecting said single-acting hydraulic cylinder with one of said pair of lines, said one of said pair of lines when carrying fluid under pressure causing the ground-engaging wheel means to be raised.

2. The combination set forth in claim 1 wherein valve means are provided in the one of said pair of lines and the further fluid line to restrict fluid flow to the double-acting cylinder through the one of said pair of lines and from the single-acting cylinder while affording free fluid flow from the double-acting cylinder through the one of said pair of fluid lines and to the single-acting cylinder.

3. In combination, a tractor having a three-point hitch including a pair of lower draft links and an upper compression link, an implement frame pivotally connected to the draft links, an arm pivotally connected to the frame and extending generally rearwardly therefrom, a ground-engaging wheel carried at the rear of the arm, extensible and retractable means for raising and lowering the rear end of the arm relative to the frame having opposite ends pivotally connected to the frame and arm, a generally vertically extending mast having its lower end pivotally connected to the frame and its upper end connected to the compression link, and selectively lockable means extending between and interconnected with the frame and mast to selectively lock and unlock, respectively, the mast and frame against and for free relative pivotal movement.

4. The combination set forth in claim 3 wherein the means to selectively lock the frame and mast from relative pivotal movement includes a hydraulic cylinder means acting to hold the frame and mast in fixed relative positions when under pressure and means to selectively supply fluid under pressure to the hydraulic cylinder means and exhaust fluid from the hydraulic cylinder means.

5. In combination, a tractor having a three-point hitch including a pair of lower draft links and an upper compression link, an implement frame pivotally connected to the draft links, an arm pivotally connected to the frame and extending generally rearwardly therefrom, a wheel carried at the rear of the arm, means connected between the arm and the frame to selectively raise and lower the arm relative to the frame, a generally vertically extending mast having its lower end pivotally connected to the frame and its upper end connected to the compression link, and means connected between the mast and frame operatively interconnected with and responsive to the first-mentioned means raising and lowering the arm relative to the frame to lock and unlock, respectively, the mast and frame against and for free relative pivotal movement.

6. In combination, a tractor having a vertically movable and power-operated hitch including a pair of lower draft links, an implement frame pivotally connected to the draft links, an arm having one end pivotally connected to the frame and extending generally rearwardly therefrom, a ground-engaging wheel carried at the rear end of the arm, an extensible and retractable hydraulic cylinder having opposite ends pivotally connected to the frame and arm for raising and lowering the rear end of the arm, and means extending between and interconnected with the tractor and frame forming an upper connection between the tractor and frame, the last-mentioned means including extensible and retractable means which is selectively lockable in a fixed position to prevent free pivotal movement of the frame on the draft links and unlockable to afford free pivotal movement of the frame on the draft links.

7. The combination set forth in claim 6 wherein the extensible and retractable means is a hydraulic cylinder having one end anchored to the frame and a second end operatively connected to the tractor and acting when supplied with fluid pressure to hold the frame in a fixed attitude relative to the tractor for any given position of the draft links.

8. The combination set forth in claim 6 wherein the means forming an upper connection between the tractor and frame further includes a generally vertically extending mast having its lower end pivotally connected to the frame, a compression link extending between and interconnected with the mast and tractor, and the extensible and retractable means extends between and is interconnected with the mast and frame to selectively lock the mast and frame from relative pivotal movement.

9. In combination, a tractor having a vertically movable and power-operated hitch including a pair of lower draft links, an implement frame pivotally connected to the draft links, an arm having one end pivotally connected to the frame and extending generally rearwardly therefrom, a ground-engaging wheel carried at the rear end of the arm, an extensible and retractable hydraulic cylinder having opposite ends pivotally connected to the frame and arm for raising and lowering the rear end of the arm, and means extending between and interconnected with the tractor and frame forming an upper connection between the tractor and frame, the last-mentioned means including extensible and retractable means operatively interconnected with and lockable and unlockable in response to the hydraulic cylinder raising and lowering, respectively, the arm relative to the frame to prevent and permit free pivotal movement of the frame about its pivotal connections with the draft links.

10. In combination with a tractor having a pair of lower draft links and a fluid system including a reservoir, a pump, a pair of outlets and valve means operable to alternately interconnect the outlets with the pump and reservoir, an implement comprising: a frame pivotally connected to the lower draft links; an arm having front and rear ends with its front end pivotally connected to the frame; wheel means carried on the rear end of the arm; a double-acting extensible and retractable hydraulic cylinder having anchor and rod ends connected to the frame and arm and operable when extending to lower the rear end of the arm relative to the frame and when retracted to raise the rear end of the arm relative to the frame; a first fluid line interconnecting one of said pair of outlets with the anchor end of the cylinder; a second fluid line interconnecting the other of said pair of outlets to the rod end of the cylinder; a single-acting extensible and retractable hydraulic cylinder having its opposite ends operatively connected to the frame and tractor and acting, when supplied with fluid under pressure, to lock the frame from free pivotal movement about its connection with the draft links and to hold the frame in a fixed attitude relative to the tractor for any given position of the draft links; and a third fluid line interconnecting the second fluid line with the single-acting hydraulic cylinder.

UNITED STATES PATENT OFFICE
CERTIFICATE OF CORRECTION

Patent No. 3,583,495     Dated 8 June 1971

Inventor(s) John Isaac Cantral et al

It is certified that error appears in the above-identified patent and that said Letters Patent are hereby corrected as shown below:

Column 4, line 64, after "mast" cancel "a"; line 67, before "downwardly" insert -- and operable when extended to force the ground-engaging wheel --.

Column 5, line 36, after "between the arm and" cancel "the".

Column 6, line 44, change "extending" to -- extended --.

Signed and sealed this 11th day of January 1972.

(SEAL)
Attest:

EDWARD M. FLETCHER, JR.          ROBERT GOTTSCHALK
Attesting Officer                Acting Commissioner of Patents